United States Patent
Fries et al.

(10) Patent No.: US 11,226,051 B2
(45) Date of Patent: Jan. 18, 2022

(54) VALVE FOR DRINKING WATER INSTALLATION

(71) Applicant: Gebr. Kemper GmbH + Co. KG Metallwerke, Olpe (DE)

(72) Inventors: Stefan Fries, Olpe (DE); Roland Blumenthal, Erftstadt (DE); Alexander Vogt, Attendorn (DE)

(73) Assignee: GEBR. KEMPER GMBH + CO., KG METALLWERKE, Olpe (DE)

( * ) Notice: Subject to any disclaimer, the term of this patent is extended or adjusted under 35 U.S.C. 154(b) by 0 days.

(21) Appl. No.: 16/809,130

(22) Filed: Mar. 4, 2020

(65) Prior Publication Data

US 2020/0284371 A1    Sep. 10, 2020

(30) Foreign Application Priority Data

Mar. 8, 2019 (DE) .......................... 202019001118.8

(51) Int. Cl.
*F16K 31/04* (2006.01)
*F16K 17/04* (2006.01)
*F16K 41/02* (2006.01)

(52) U.S. Cl.
CPC ............ *F16K 31/04* (2013.01); *F16K 17/042* (2013.01); *F16K 41/02* (2013.01)

(58) Field of Classification Search
CPC ........ F16K 31/04; F16K 17/042; F16K 41/02; F16K 31/002; F16K 1/52
See application file for complete search history.

(56) References Cited

U.S. PATENT DOCUMENTS

2012/0204981 A1 * 8/2012 Coerdt .................. E03B 7/04
137/563

FOREIGN PATENT DOCUMENTS

| CA | 2806467 A1 | 9/2011 |
|---|---|---|
| DE | 44 11 013 | 8/1995 |
| DE | 201 09 619 | 9/2001 |
| DE | 203 21 608 | 7/2008 |
| DE | 10 2011 010 840 | 8/2012 |
| DE | 10 2017 110343 A1 | 5/2017 |
| DE | 10 2016 119572 A1 | 4/2018 |
| EP | 1 385 072 | 1/2004 |
| EP | 1 947 395 | 7/2008 |
| EP | 2 546 718 A1 | 1/2013 |

OTHER PUBLICATIONS

Machine Translation of DE20109619, retrieved Apr. 10, 2021 (Year: 2001).*
German Search Report for Publication No. 20 2019 001 118.8 dated Feb. 7, 2020.
Canadian Office Action for related Canadian Application No. 3,074,475 dated Apr. 22, 2021.

* cited by examiner

*Primary Examiner* — Michael R Reid
(74) *Attorney, Agent, or Firm* — Fay Sharpe LLP

(57) ABSTRACT

A valve for a drinking water installation for larger volume flow of cold water, depending on an adjustable or non-adjustable water temperature, having a valve housing with connections to a pipeline and a regulating piston which is movable in the valve housing, coupled to a spindle exposed on the outer side of the valve housing, with a thermal expansion element exposed in the flow path through the valve housing and resting under the pretension of a spring element against the regulating piston, the regulating piston being movable relative to a bore due to the expansion of the expansion element.

20 Claims, 9 Drawing Sheets

VALVE FOR DRINKING WATER INSTALLATION

This application claims priority to German Patent Application Serial No. 202019001118.8 filed Mar. 8, 2019, the entirety of which is fully incorporated by reference herein.

The present invention relates to a valve for drinking water installation according to the features of the preamble of claim 1. Such a valve is known from DE 10 2011 010 840 A1.

The present invention relates in particular to a valve for regulating a cold water circulation. The valve housing has formed therein a flow path for the drinking water, in which a thermal expansion element is exposed, the thermal expansion element resting under the pretension of a spring element against a regulating piston. The regulating piston is moved relative to a bore due to the expansion of the expansion element. As a result, a temperature-controlled regulation of the flow through the valve takes place. This flow through the valve takes place with the aim of setting a Kv min for drinking water having a low temperature, so that only minimum circulation will take place, if the drinking water is cold enough. On the other hand, if the temperature of the drinking water rises, an increase in the circulation through the valve is aimed at, so as to discharge the warm drinking water as quickly as possible from the pipe section associated with the valve and supply it to a cooling unit via a circulation pipe, which is usually provided with a pump, as described e.g. in EP 2 487 301 B1. The installation situations described there also apply to imaginable installation situations of the valve according to the present invention.

The valve for controlling a cold water circulation known from DE 10 2011 010 840 A1 still leaves room for improvement, since the solution described there corresponds to a conventional valve for regulating a hot water circulation. This kind of regulation has been known for a long time, the only difference being that the behavior of the expansion element is utilized in such a way that the flow passage will be enlarged with rising water temperatures and not reduced as is the case with thermal control valves for hot water circulation. As for the rest, the design principles of hot water regulating valves are adopted identically. However, these design principles do not sufficiently meet the circulation requirements in a cold water system.

The present invention is based on the problem of providing an insofar improved valve for drinking water installation which, depending on an adjustable or non-adjustable temperature, allows a larger volume flow of cold water, if a water temperature is higher than this temperature, and which, in the case of a low temperature, preferably controls the flow rate to a minimum volume flow.

For solving this problem, the present invention suggests a valve having the features of claim 1. An alternative solution is specified in claim 5. Both aspects in combination provide a valve that is adapted to cold water circulation in the best possible manner.

According to the solution defined in claim 1, the valve can set a very small volume flow at Kv min of approx. 0.05 m³/h+/−0.01 m³/h. In contrast to conventional regulating valves, the regulating gap is here not formed as an annular gap in the circumferential direction. Rather, a radially extending, circumferentially non-continuous gap is provided between the outer circumferential surface of the regulating piston and the bore that is usually a fixed part of the housing. Through this gap, a Kv min flow passage is defined. The flow passage is defined, when the regulating piston with its Kv min setting area is located on the level of the bore. This position of the Kv min setting area is referred to as Kv min position.

A very small Kv min flow passage is defined by a single, radially extending gap. It goes without saying that also a plurality of radially extending gaps may be provided, each of them being non-continuous in the circumferential direction. The gap usually extends over a few degrees in the circumferential direction, e.g. between 2 and 8°.

The Kv min setting area of the regulating piston is here formed by a certain piston area, which extends in an axial direction and which is located within the bore at the Kv min position.

Adjacent the Kv min setting area, the regulating piston usually forms an outer circumferential surface, which increasingly allows cold water to pass through the regulating gap as the temperature of the drinking water rises thus causing an expansion of the expansion element. In this way, the flow passage between the regulating piston and the bore is enlarged so as to discharge warm, stale water.

The regulating piston usually comprises a plastic sealing element in its Kv min setting area, the outer circumferential surface of this plastic sealing element defining the gap at the Kv min position of the regulating piston. The outer circumferential surface of this plastic sealing element may, at least along part of its circumference, abut against a countersurface, which is usually a fixed part of the housing and which establishes the bore, and circumferentially seal the regulating gap, at least the major part thereof. Sealing at least the major part in the circumferential direction means here sealing at least 330°, preferably at least 350° of the circumferential dimension of the bore.

According to a preferred further development of the present invention, the regulating piston comprises a plastic sealing element in its Kv min setting area, the plastic sealing element having a radial slot defining the regulating gap at the Kv min position of the regulating piston. This plastic sealing element may abut against the countersurface under radial pretension. A support surface, which supports the sealing element and which may be defined by a regulating piston base, and/or the inner circumferential surface of the bore may be conical in shape, so that, as the Kv min position is increasingly approached, the annular plastic sealing element will be compressed in the slot area and the flow passage will be narrowed in this way. It should be impossible to adjust by the expansion element a position at which the flow passage is completely obstructed or has been rendered impossible.

According to the alternative embodiment, which, particularly preferred, is effective in connection with the formation of the above discussed Kv min setting area on the regulating piston, the latter additionally has a Kv max setting area. In this Kv max setting area of the regulating piston, support points are formed on the outer circumferential surface of the regulating piston. Between these support points, flow passage hollows are provided. Accordingly, support points and flow passage hollows alternate in the circumferential direction on the level of the Kv max setting area. At a Kv max position of the regulating piston, the support points extend up to the bore. This has the effect that the piston will be guided and supported at the Kv max position. In this respect, it should be taken into account that the spring element used for tensioning the regulating piston in the direction of the spindle with interposition of the expansion element is usually compressed to a substantial extent at the Kv max position and that the regulating piston is, directly or indirectly via the expansion element, axially guided relative to the spindle only to an insufficient extent and is only directly or indirectly supported thereagainst on the end face thereof. The support points thus cause the regulating piston to be guided to a certain extent at the Kv max position. The support points need not be configured in a manner establishing a fit. The support points may define an enveloping surface that is slightly smaller than the inner circumferential surface of the bore. However, usually at least two support points abut against the countersurface established by the bore, so that the regulating piston will be supported and guided at the Kv max position by the housing usually defining the bore.

According to a preferred further development of the present invention, the Kv max setting area is provided on the regulating piston between the Kv min setting area and the spindle. It follows that, starting from the spindle, the regulating piston defines first the Kv max setting area, followed by a regulating setting area for regulating the flow passage on the basis of the expansion of the expansion element and a Kv min setting area for setting the Kv min flow passage. This setting area usually also indicates the highest position of the regulating piston within the framework of its movement inside the valve housing. At this highest position, the regulating piston is maximum close to a valve head, through which the spindle extends. Accordingly, the distance to the bottom is greatest at the highest position.

According to a preferred further development of the present invention, the spindle is rotatably supported in a valve insert housing. This valve insert housing defines at least a first radial flow passage leading to the expansion element. This first radial flow passage may be the inlet opening or the outlet opening to a flow path within the valve insert housing, in which the expansion element is exposed. On the end located opposite the spindle, the valve insert housing according to the preferred further development of the present invention is connected to an inlet sleeve, which is usually sealingly connected, normally screw-fastened, to the valve insert housing and which defines a second radial flow passage defined by the other one of the inlet and outlet openings to the flow path. Preferably, the inlet sleeve defines here the inlet of the flow to the expansion element. The inlet sleeve additionally defines a bottom, on which the spring element rests with the free lower end thereof.

In comparison with the solution known from DE 10 2011 010 840 A1, this structural design offers the advantage that the flow enters radially and not—as with the above-mentioned prior art—through the spring element, where it must first radially pass the coils of the spring so as to arrive at the expansion element. Cases are imaginable, where the spring coils are spaced apart comparatively closely. In this case, an unhindered flow through the valve insert housing will not be possible.

According to a preferred further development of the present invention, the inlet sleeve preferably defines a support collar, the spring element resting against the interior of this support collar. The spring is a coil spring. The support collar prevents the spring element from buckling and guides the coil spring on the outside. The support collar is preferably formed by a spring support sleeve, which is supported to be axially movable relative to the valve insert housing, preferably supported such that it is axially movable within the inlet sleeve to a limited extent. The inlet sleeve defines at least one end-side stop against which the spring support sleeve abuts, prior to assembly, due to the pretension of the spring element, so that the valve insert housing together with the inlet sleeve and the spring support sleeve can be handled as a unit and screwed into the valve housing.

Preferably, the spring support sleeve rests against the valve housing in the installation situation. This will avoid dead spaces and the like, which might arise between the bottom of the inlet sleeve closed on the lower side thereof and the opposite wall forming the valve housing.

According to a further preferred embodiment, a valve disk is provided, which carries a sealing disk abutting, at a closure position of the valve, against a sealing seat provided adjacent the bore. The valve disk preferably supports the expansion element. Accordingly, the valve disk is located between the spindle and the expansion element and is usually contacted, preferably directly, by the spindle-side end of the expansion element.

According to a preferred embodiment of the present invention, a motor drive operatively connected to the spindle is provided. This motor drive is, in particular, suitable for setting Kv max. Kv max of the valve according to the present invention especially allows flushing of the pipe sections associated with the valve. In this case, Kv max is set such that, at the usual system pressures, a volume flow of 1.8 $m^3/h+/-0.5 \ m^3/h$ can be set. Such a regulation characteristic cannot be set through the expansion of the expansion element alone. Rather, Kv max is preferably set by the motor drive in the case of the valve according to the present invention. To this end, the motor drive has a control unit, which comprises a memory having stored therein at least one predetermined flushing regime. The control unit is here configured such that the motor drive will move the regulating piston, preferably axially advance the regulating piston like a plunger, from a preset regulating position to the Kv max position for flushing. The preset regulating position is here a position of the regulating piston at which the regulating setting area or the Kv min setting area lies within the bore. In addition, the control unit is adjusted such that, when the flushing operation has been finished, the regulating piston will be reset to the preset regulating position by driving by means of the motor drive. In so doing, the motor drive usually cooperates with the spindle, which, however, may also be manually rotated, independently of the motor, and thus adjusted.

With respect to a compact and functionally independent solution, the motor drive, the control unit and the memory are preferably accommodated in a uniform drive housing, which is preferably connected to the valve housing such that it is secured against rotation relative thereto. The connection between the valve housing and such a drive may be established e.g. according to DE 20 2006 013 186 U1, which originated from the applicant of the present application.

With the valve according to the invention, the regulating body is axially movable in the Kv min setting area while maintaining a constant volume flow within limits in the bore on the housing side. Accordingly, the Kv min flow passage has a constant flow cross-section over a certain axial extension. The same applies to the Kv max setting area and the Kv max flow passage.

In the following, the present invention will be explained in more detail on the basis of an embodiment in combination with the drawing, in which.

Figure 1:
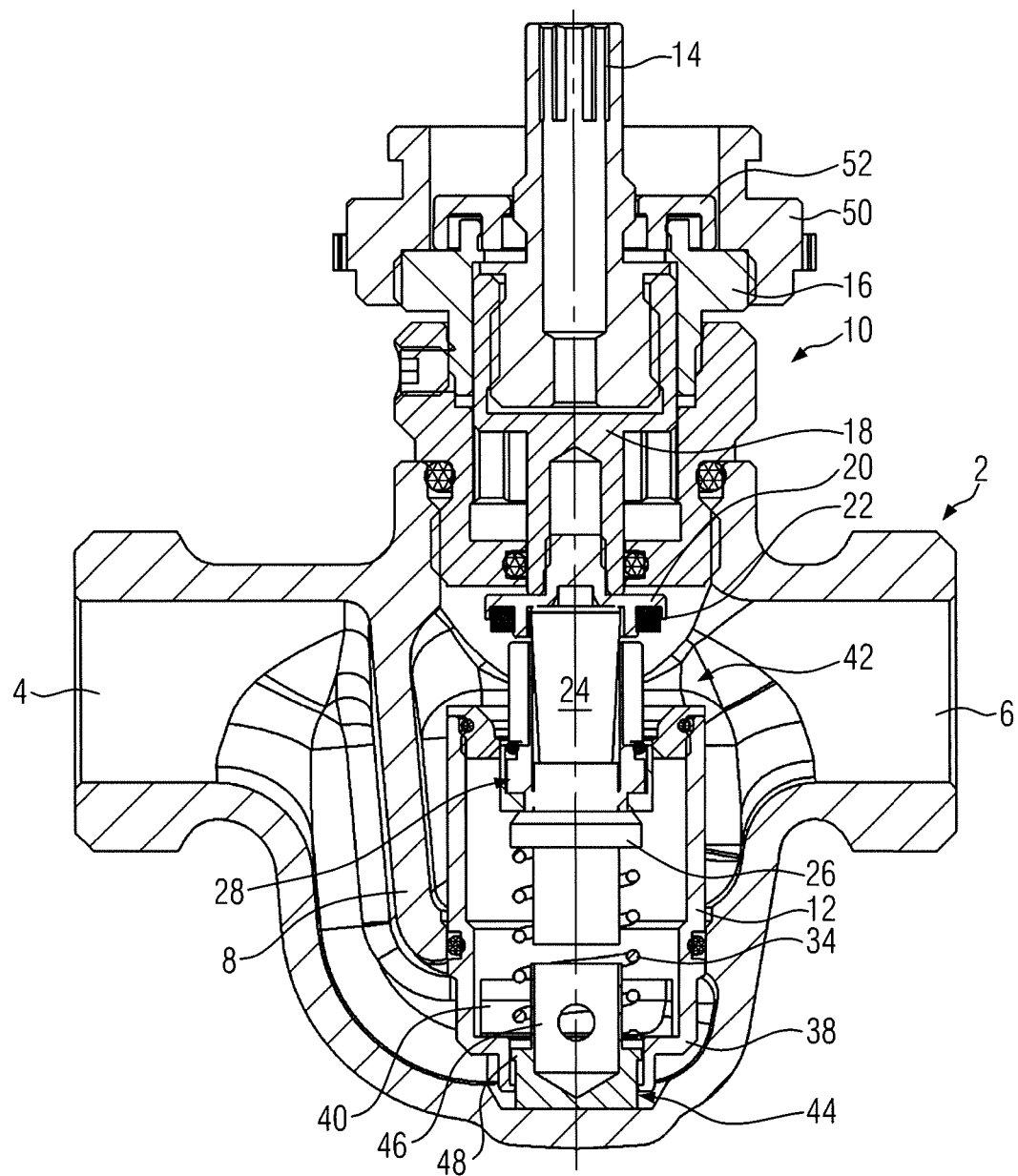
FIG. 1 shows a longitudinal sectional view of an embodiment of a valve according to the present invention.

FIG. 1 shows an embodiment of a valve with a valve housing 2, which defines an inlet opening 4 and an outlet opening 6. The valve housing 2 has provided therein a partition 8, which defines a bore having a valve insert 10 sealingly installed therein.

The valve insert 10 has a valve insert housing 12, in which a spindle 14 is rotatably supported, the spindle 14 being supported via a regulating top 16, which is screw-fastened to the valve insert housing 12. The regulating top 16 has projections, which engage over part of the spindle 14 and thus fix the spindle 14 axially in position relative to the valve top 16. The valve top 16 is screw-fastened inside the valve insert housing 12 and can there be adjusted, thus allowing the spindle 14 to be preset.

The spindle 14 is a non-rising spindle that is in engagement with a setting element 18, which, on the opposite side, cooperates with a valve disk 20 that engages an opening of the setting element 18 with a cam. On the lower surface opposed to the setting element 18, the valve disk 20 carries a sealing disk 22, which circumferentially surrounds an expansion element 24. The expansion element 24 has a central pin that engages a complementarily configured, slightly conical insert bore of the valve disk 20. The expansion element 24 has a contact collar 26 against which a regulating piston 28 abuts. This regulating piston 28 consists of a metallic regulating piston base 30 and a plastic sealing element 32 made of plastic material, cf. FIG. 4. On the side opposite to the regulating piston 28, a spring element 34 abuts under pretension against the expansion element 24. The other end of the spring element 34 rests against a contact surface 36 of an inlet sleeve identified by reference numeral 38. This inlet sleeve 38 defines opposed valve-insert inlet openings 40 through which the cold water to be regulated flows to the expansion element 24. Reference numeral 42 identifies valve-insert outlet openings through which the flow exits the valve insert 10.

Figure 4:
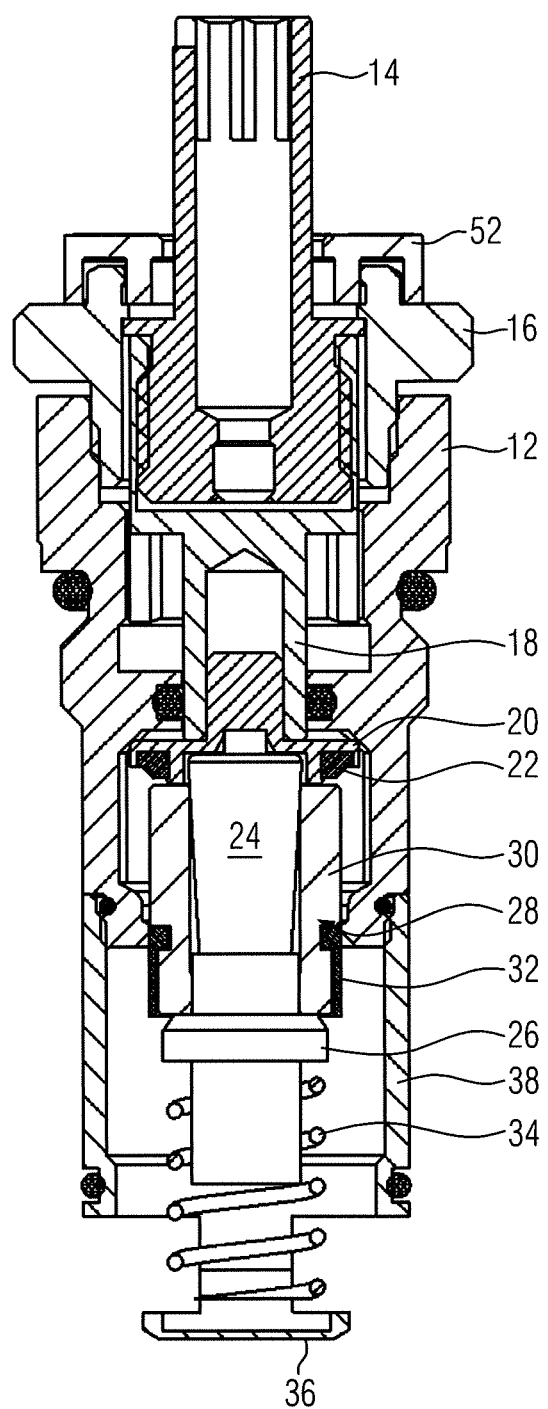
FIG. 4 shows a longitudinal sectional view of an alternative valve insert.

As can especially be seen in FIG. 4, the inlet sleeve 38 is screw-fastened to the valve insert housing 12. A seal seals the screw connection. At its lower end, the inlet sleeve 38 has a further sealing ring, which seals the valve insert 10 against the bore formed in the partition 8. In the embodiment according to FIG. 1, the inlet sleeve 38 is formed onto the valve insert housing 12 as a segment of a uniform component.

Figure 2:
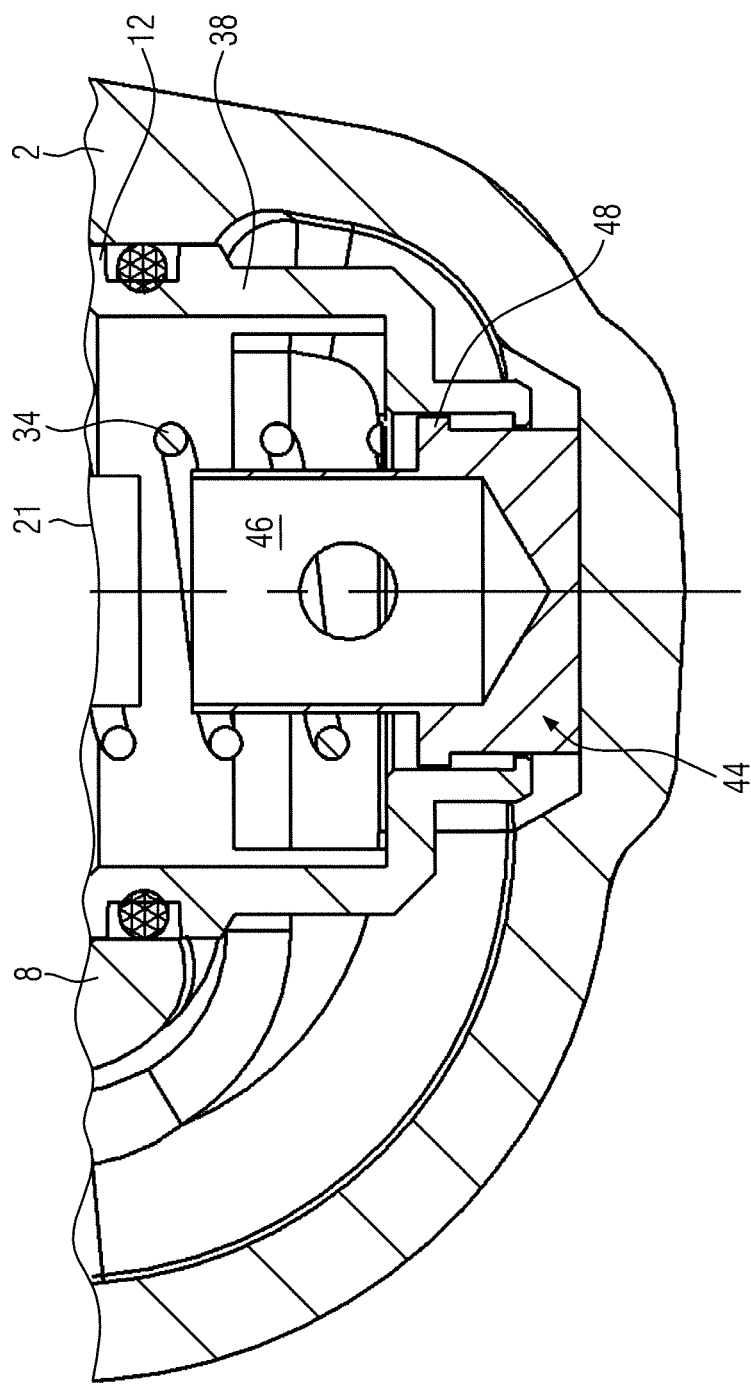
FIG. 2 shows an enlarged detail of the sectional view according to FIG. 1.
Figure 3:
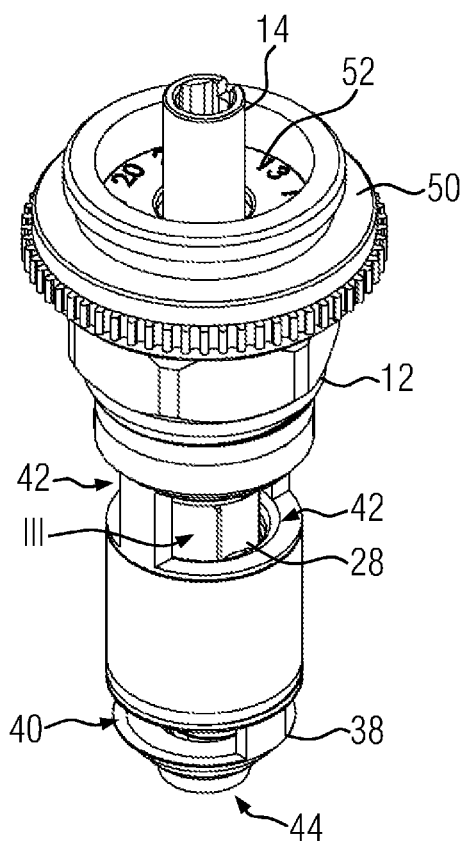
FIG. 3 shows a perspective side view of the valve insert according to FIG. 1.

In the embodiments according to FIGS. 1 to 3, the spring element 34 rests on a spring support sleeve 44 on the lower side thereof, the spring support sleeve 44 being provided with at least two opposed holes on its outer circumference so as to avoid dead spaces. These holes are provided in the area of a support collar 46, which circumferentially supports the spring element 34 configured as a coil spring. The support collar 46 projects beyond a support ring 48, against which the spring element 34 abuts on an end side thereof and which defines a radially outwardly protruding locking projection that is axially movable and limited in its downward movement by a stop. The spring support sleeve 44 can thus be axially moved relative to the valve insert 10 to a limited extent.

As can be seen, this movability is used to support, in the installation situation of the valve insert 10, the spring support sleeve 44 on the valve housing 2 and to place it thereagainst. The spring support sleeve 44 can thus be open at the bottom or—as illustrated by FIG. 2—closed at the bottom.

The support collar 46 has an inner diameter that is configured to receive therein the free end of the expansion element 24.

On the opposite end of the valve insert 10, a setting wheel 50 is arranged, which is provided such that it is secured against rotation relative to the setting element 18 and which cooperates with a scale 52 to preset a Kv min value and to indicate the preset value via the scale 52, which is rotated relative to the spindle having a corresponding mark during the presetting operation. The setting wheel 50 may, however, also be used as a motor adapter for a drive unit setting the spindle 14.

FIG. 4 shows an embodiment that is slightly modified in comparison with the embodiment according to FIGS. 1 to 3. Essentially, this embodiment is only different with respect to the structural design of a bottom 36, which defines the contact surface for the spring element and which is here flat and does not cooperate with the valve housing 2 in the installation situation. Like components are identified by like reference numerals in comparison with the above-discussed embodiment.

Figure 5:
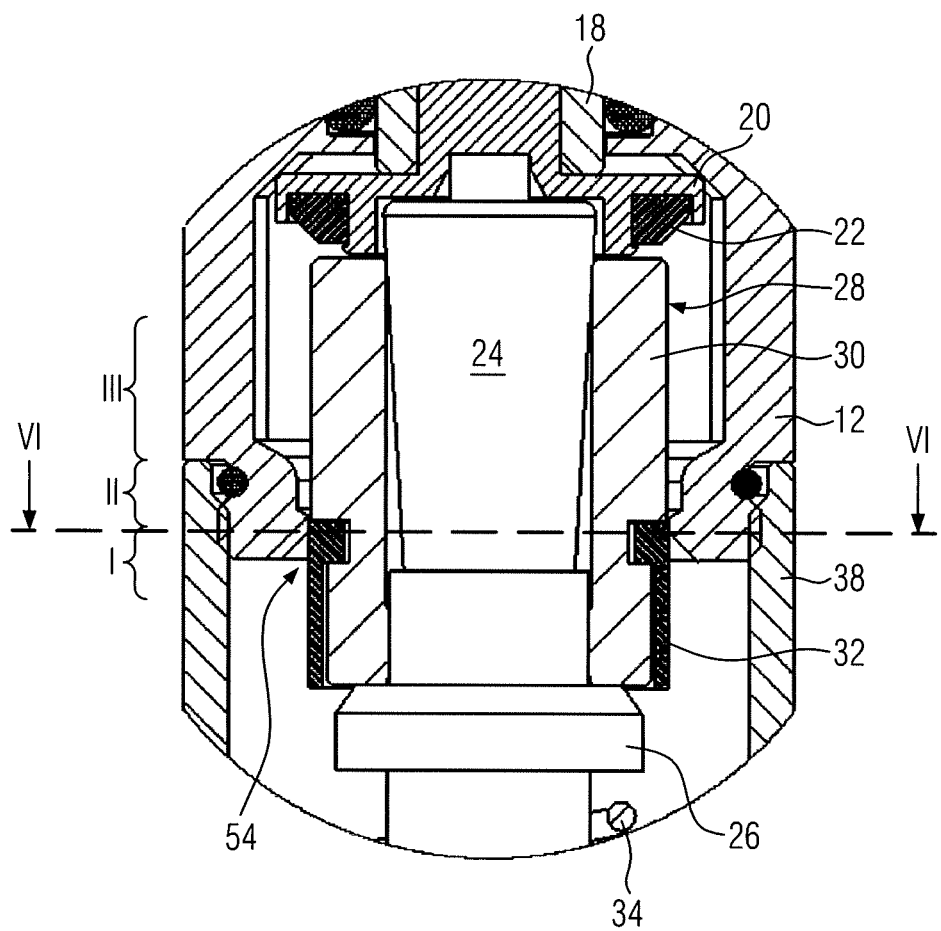
FIG. 5 shows an enlarged detail of the embodiment according to FIG. 1.

FIG. 5 shows the regulating piston 28 at its Kv min position and applies also to the first embodiment. At this position, the outer circumferential surface of the plastic sealing element 32 cooperates as an almost complete circumferential seal with a bore 54 defined by the valve insert housing 12.

Figure 6:
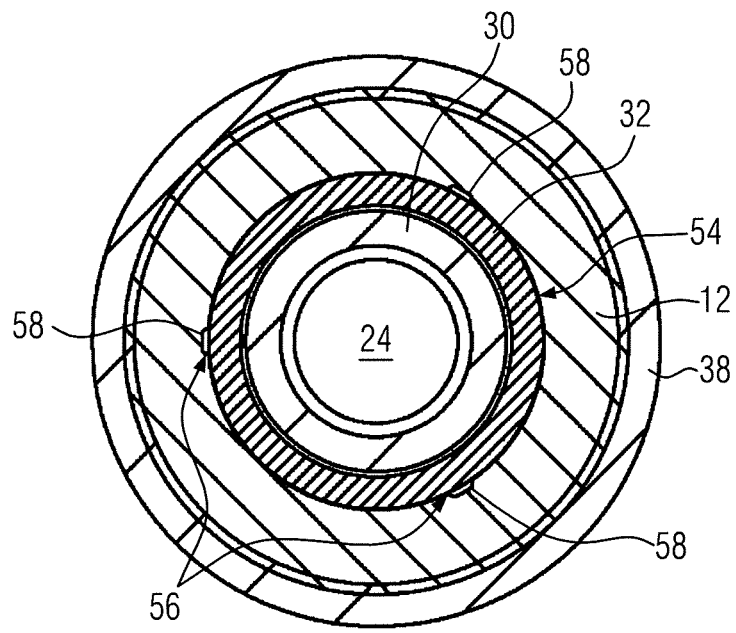
FIG. 6 shows a cross-sectional view along line VI-VI for a first variant concerning the design of the Kv min setting area.

FIG. 6 shows here flow passages for a first variant identified by reference numeral 56 and defined by radial notches 58 within the bore 54. The notches 58 extend in a radial direction, but only have small circumferential dimensions. Three circumferentially distributed notches 58 are provided, which together set the flow passage at the shown Kv min position of the regulating piston 28. The plastic sealing element 32 is circumferentially closed in this variant.

Figure 7:
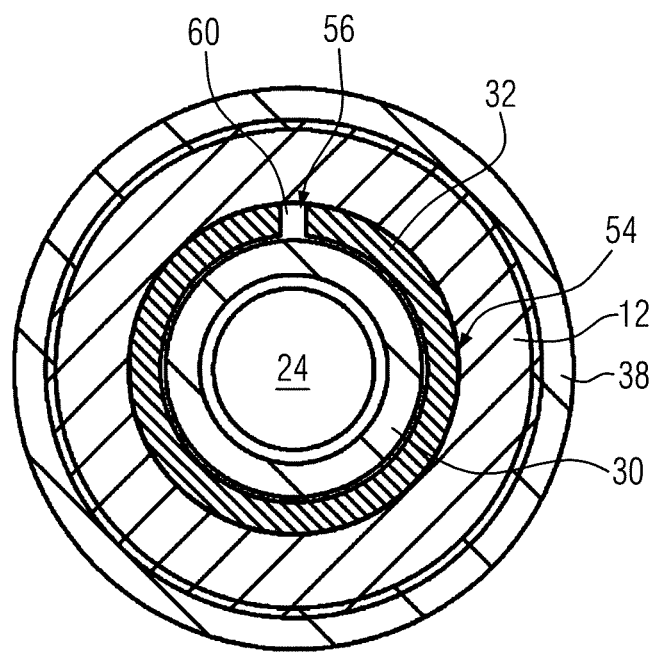
FIG. 7 shows a second variant modified in comparison with FIG. 6.

The situation is different as regards the embodiment according to FIG. 7. There, the plastic sealing element 32, which is configured like a closed sealing ring in FIG. 6, is slotted. In this way, a C-shaped structural design with a radial slot 60 defining the only flow passage 56 is obtained. It is easily imaginable that, in the case of a conical design of the regulating piston base 30 and/or the bore 54, this slot may be enlarged or reduced in size, depending on the position of the expansion element 24, so as to variably adjust the flow passage 56.

FIGS. 5, 6 and 7 show the constellation of the regulating piston 28 and the bore 54 at the Kv min position. As described above, the flow passage 56 is not formed circumferentially between the bore 54 and the regulating piston 28. Rather, there is only provided at least one discrete section in the circumferential direction, which allows a flow to pass therethrough. As for the rest, the plastic sealing element 32 is in substantially full circumferential contact with the inner circumferential surface of the predominantly circular bore

54. The Kv min setting area defined by the regulating piston 28 at the above described position is identified by I in FIG. 5.

Upstream, when seen in the direction of the spindle 14, the regulating piston 28 defines a Kv max setting area identified by reference numeral III. As illustrated by the sectional view according to FIG. 9, the regulating piston 28 has a substantially starlike cross-sectional shape and defines support points 62, which are circumferentially distributed and between which flow passage hollows 64 are formed. The support points 62 extend up to the inner circumferential surface of the bore 54 and may also rest thereon, so as to counteract a possibly occurring buckling load of the spring element 34. The flow passage hollows 64 define, at the Kv max position shown, the Kv max flow passage, which is identified by reference numeral 66. This structural design is also realized in the case of the embodiment according to FIG. 1.

Figure 8:
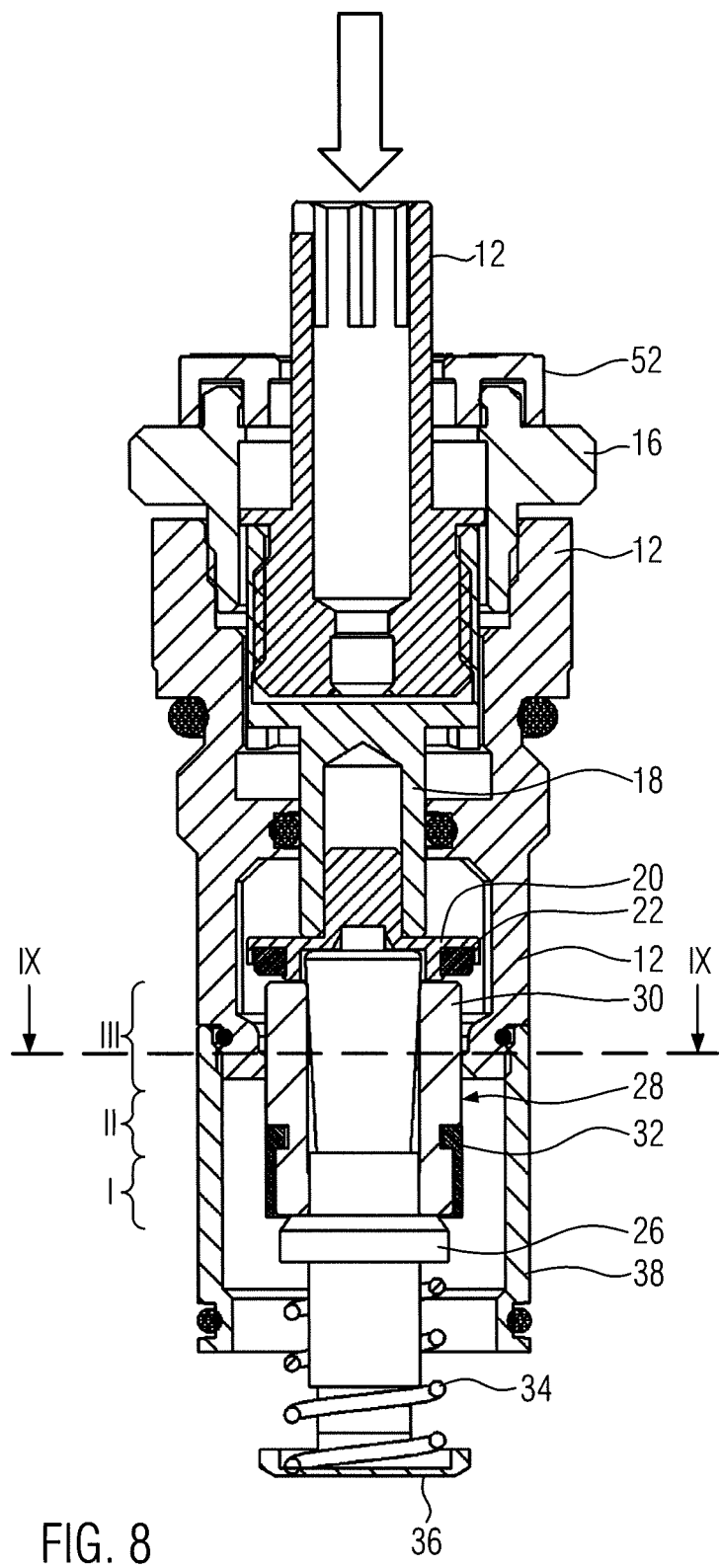
FIG. 8 shows the second embodiment at a flushing position.
Figure 9:
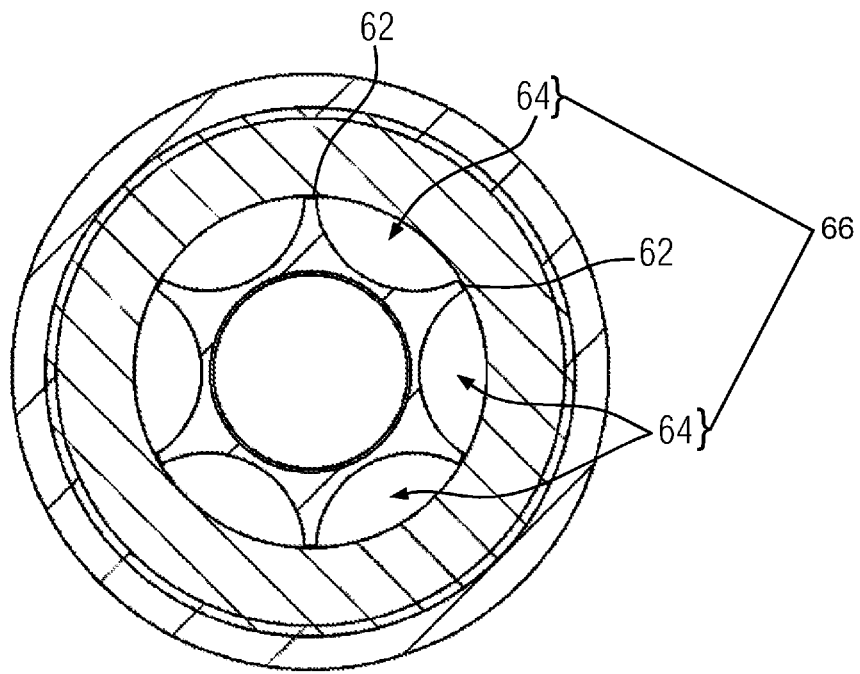
FIG. 9 shows a cross-sectional view along the section line IX-IX according to FIG. 8.

Between the Kv max setting area of the regulating piston 28 according to FIGS. 8 and 9, which is identified by reference numeral III, and the Kv min setting area I according to FIGS. 6 to 8, there is a regulating setting area II, in which the flow passage is enlarged. This regulating setting area II sweeps the inner circumferential surface of the bore 54 due to the rotation of the expansion element 24.

Figure 10:
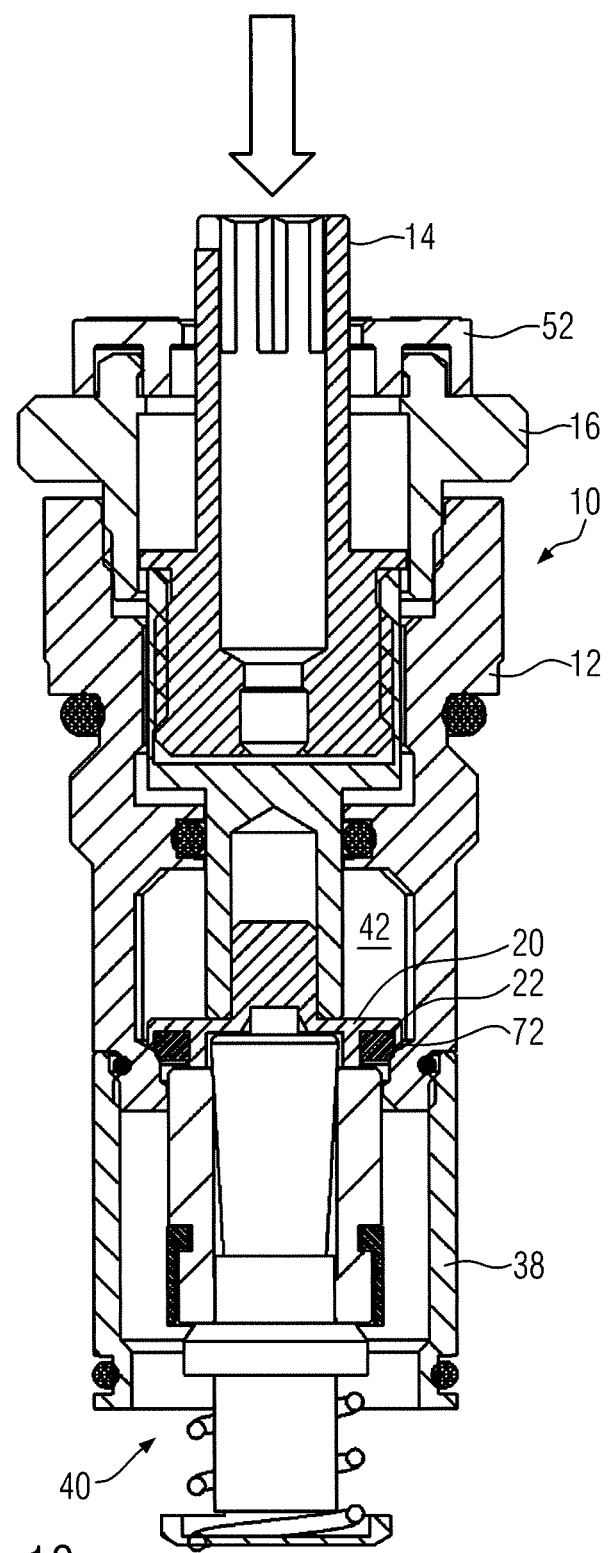
FIG. 10 shows a longitudinal sectional view of the second embodiment at a closing position.
Figure 11:
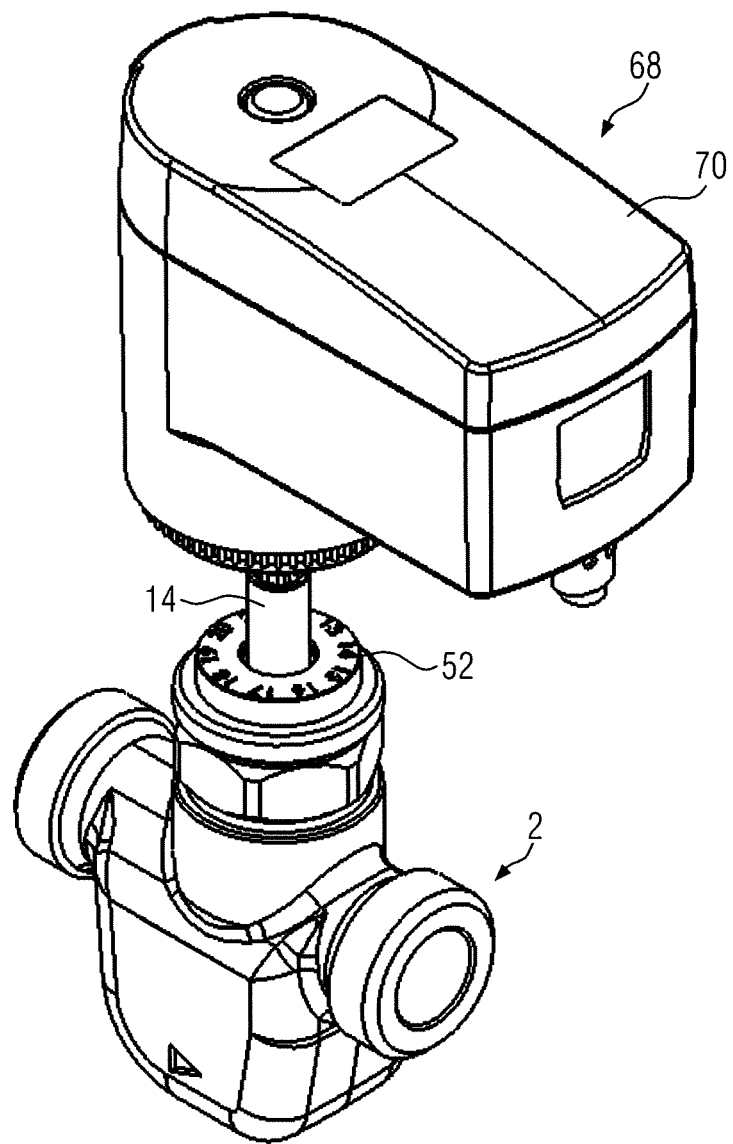
FIG. 11 shows the embodiment according to FIG. 1 in a perspective side view with a drive unit.

As can be seen, the spindle 14 must be set to move, starting from the Kv min position, to the Kv max position shown in FIGS. 9 and 10 (cf. the arrow in FIG. 8). The Kv max position corresponds here to the flushing position of the embodiment shown. This flushing position is preferably set by means of a drive unit 68 shown in FIG. 11, which has a uniform drive housing 70 accommodating therein an electric motor, not shown, a memory and a control unit. In the case of one modification, the drive housing 70 may only accommodate the motor drive. The control signals and the memory may be stored in a central control unit, which is data-connected to the motor drive located inside the drive housing 70. The drive housing 70 may have provided therein an autonomous energy source, e.g. a battery or an accumulator.

The memory is here configured such that the drive unit has transmitted thereto a signal at predetermined time intervals, for example after approx. 36 hours+/−10 hours, indicating that the Kv max position should be set, so that the pipe upstream of the valve will be flushed and stale water will be removed.

The valve according to the present invention offers here the possibility of discharging volume flows of approx. 1-2 m³/h during flushing. This value corresponds to Kv max. Due to the special structural design of the regulating piston 28, a Kv min of approx. 0.05 m³/h can be set.

It goes without saying that the control unit provided in the drive unit 68 may also trigger and monitor the flushing process in a temperature-controlled manner. To this end, it has an interface for a temperature sensor, which measures and monitors the water temperature in the pipe area upstream of the valve.

When the flushing operation has been finished, the motor drive resets the position of the regulating piston 28, which was previously given by the expansion element alone.

The closing position shown in FIG. 10 can be accomplished via the drive unit or manually. In this case, the spindle drive presses the valve disk 20 downwards until the sealing disk 22 rests against a sealing seat 72 provided adjacent to the bore 54. In this way, the valve can be shut off for maintenance work or for controlled sectional flushing of individual lines of a water pipe system for cold water.

FIG. 10 assumes here a motor drive moving the spindle 14 axially like a plunger. The movement of the spindle continues until the sealing disk 22 abuts against the sealing seat 72. When the valve is closed manually, the spindle is rotated. If the motorized drive outlined above is provided, it will be removed in advance. The spindle 14 is rotated by hand via a hexagon provided at the free end of spindle 14, until the closing position has been reached.

LIST OF REFERENCE NUMERALS

2 valve housing
4 inlet opening
6 outlet opening
8 partition
10 valve insert
12 valve insert housing
14 spindle
16 regulating top
18 setting element
20 valve disk
22 sealing disk
24 expansion element
26 contact collar
28 regulating piston
30 regulating piston base
32 plastic sealing element
34 spring element
36 bottom/contact surface
38 inlet sleeve
40 valve-insert inlet opening
42 valve-insert outlet opening
44 spring support sleeve
46 support collar
48 support ring
50 setting wheel
52 scale
54 bore
56 flow passage Kv min
58 notch
60 radial slot
62 support point
64 flow passage hollow
66 flow passage Kv max
68 drive unit
70 drive housing
72 sealing seat
I Kv min setting area
II regulating setting area
III Kv max setting area

The invention claimed is:
1. A valve for drinking water installation, comprising:
a valve housing with connections to a pipeline, and a regulating piston,
which is movable in the valve housing and coupled to a spindle exposed on the outer side of the valve housing and which cooperates, on the side opposed to the spindle, with a thermal expansion element exposed in a flow path through the valve housing and resting under the pretension of a spring element against the regulating piston, the regulating piston being movable relative to a bore due to the expansion of the expansion element,
wherein the regulating piston defines a Kv min setting area, through which, at the Kv min position of the regulating piston, a Kv min flow passage is formed between the regulating piston and the bore by at least one gap extending radially on the regulating piston and/or the bore, wherein the gap at the Kv min position is circumferentially non-continuous and wherein the Kv min flow passage has a constant flow cross-section and has a constant radial length over the entirety of the gap.

2. The valve according to claim 1, wherein the regulating piston comprises a plastic sealing element in its Kv min setting area, the outer circumferential surface of this plastic sealing element defining the gap at the Kv min position of the regulating piston.

3. The valve according to claim 1, wherein the regulating piston comprises a plastic sealing element in its Kv min setting area, the outer circumferential surface of this plastic sealing element abutting at least along part of its circumference against a countersurface establishing the bore, at the Kv min position of the regulating piston.

4. The valve according to claim 1, wherein the regulating piston comprises a plastic sealing element in its Kv min setting area, the plastic sealing element having a radial slot defining the gap at the Kv min position of the regulating piston.

5. The valve according to claim 1, wherein the regulating piston defines a Kv max setting area with support points formed on the outer circumferential surface of the regulating piston and intermediate flow passage hollows and that, at the Kv max position of the regulating piston, the support points extend up to the bore and the flow passage hollows provided therebetween define a Kv max flow passage.

6. The valve according to claim 5, wherein the Kv max setting area is provided on the regulating piston between the Kv min setting area and the spindle.

7. The valve according to claim 5, wherein the spindle is rotatably supported in a valve insert housing, which defines at least one radial flow outlet leading to the expansion element and which, at its end located opposite the spindle, is connected to an inlet sleeve defining at least a second radial flow passage and a bottom, on which the spring element rests.

8. The valve according to claim 7, wherein the bottom is defined by a spring support sleeve, which is supported such that it is axially movable relative to the valve insert housing and which rests on the valve housing and defines an interiorly supporting support collar for the spring element.

9. The valve according to claim 1, further comprising a valve disk supporting the expansion element and carrying a sealing disk, which, at a closing position of the valve, abuts against a sealing seat provided adjacent the bore.

10. The valve according to claim 1, further comprising a motor drive operatively connected to the spindle and connectable to a control unit, which comprises a memory having stored therein a predetermined flushing regime, and that the control unit is configured such that the motor drive will move the regulating piston from a preset regulating position to the Kv max position for flushing and, when the flushing operation has been finished, reset the regulating piston to the preset regulating position.

11. The valve according to claim 10, wherein the motor drive, the control unit and the memory are accommodated in a uniform drive housing connected to the valve housing.

12. The valve according to claim 11, wherein the drive housing is secured against rotation relative to the valve housing.

13. A valve for drinking water installation, comprising a valve housing with connections to a pipeline, and a regulating piston, which is movable in the valve housing and coupled to a spindle exposed on the outer side of the valve housing and which cooperates, on the side opposed to the spindle, with a thermal expansion element exposed in a flow path through the valve housing and resting under the pretension of a spring element against the regulating piston, the regulating piston being movable relative to a bore due to the expansion of the expansion element, wherein the regulating piston defines a Kv max setting area with support points formed on the outer circumferential surface of the regulating piston and intermediate flow passage hollows, and that, at the Kv max position of the regulating piston, the support points extend up to the bore and the flow passage hollows provided therebetween define a Kv max flow passage.

14. The valve according to claim 13, wherein the Kv max setting area is provided on the regulating piston between the Kv min setting area and the spindle.

15. The valve according to claim 13, wherein the spindle is rotatably supported in a valve insert housing, which defines at least one radial flow outlet leading to the expansion element and which, at its end located opposite the spindle, is connected to an inlet sleeve defining at least a second radial flow passage and a bottom, on which the spring element rests.

16. The valve according to claim 15, wherein the bottom is defined by a spring support sleeve, which is supported such that it is axially movable relative to the valve insert housing and which rests on the valve housing and defines an interiorly supporting support collar for the spring element.

17. The valve according to claim 13, further comprising a valve disk supporting the expansion element and carrying a sealing disk, which, at a closing position of the valve, abuts against a sealing seat provided adjacent the bore.

18. The valve according to claim 13, further comprising a motor drive operatively connected to the spindle and connectable to a control unit, which comprises a memory having stored therein a predetermined flushing regime, and that the control unit is configured such that the motor drive will move the regulating piston from a preset regulating position to the Kv max position for flushing and, when the flushing operation has been finished, reset the regulating piston to the preset regulating position.

19. The valve according to claim 18, wherein the motor drive, the control unit and the memory are accommodated in a uniform drive housing connected to the valve housing.

20. The valve according to claim 19, wherein the drive housing is connected to the valve housing via a regulating valve top that is screw-fastened inside the valve housing, such that it is secured against rotation relative thereto.

* * * * *